United States Patent
Verhoog et al.

(10) Patent No.: US 9,958,028 B2
(45) Date of Patent: May 1, 2018

(54) DEVICE FOR DAMPING TORSION OSCILLATIONS, NOTABLY FOR A MOTOR VEHICLE TRANSMISSION SYSTEM

(71) Applicant: VALEO EMBRAYAGES, Amiens (FR)

(72) Inventors: Roel Verhoog, Gournay sur Aronde (FR); Franck Cailleret, Amiens (FR)

(73) Assignee: Valeo Embrayages (FR)

( * ) Notice: Subject to any disclaimer, the term of this patent is extended or adjusted under 35 U.S.C. 154(b) by 105 days.

(21) Appl. No.: 14/988,963

(22) Filed: Jan. 6, 2016

(65) Prior Publication Data
US 2016/0195164 A1    Jul. 7, 2016

(30) Foreign Application Priority Data
Jan. 7, 2015    (FR) ...................... 15 50079

(51) Int. Cl.
*F16F 15/30*    (2006.01)
*F16F 15/14*    (2006.01)

(52) U.S. Cl.
CPC ............ *F16F 15/30* (2013.01); *F16F 15/145* (2013.01); *F16F 2226/045* (2013.01)

(58) Field of Classification Search
CPC ..... F16F 15/30; F16F 15/145; F16F 2226/045
See application file for complete search history.

(56) References Cited

U.S. PATENT DOCUMENTS 5,884,735 A * 3/1999 Eckel ................... F16F 15/145
                                                    188/378

FOREIGN PATENT DOCUMENTS

| EP | 2687749 A1 | 1/2014 |
| FR | 2982335 A1 | 5/2013 |
| WO | WO2014012835 A1 | 1/2014 |

OTHER PUBLICATIONS

French Search Report for corresponding FR 1550079.

* cited by examiner

*Primary Examiner* — Thomas C Diaz
(74) *Attorney, Agent, or Firm* — Berenato & White, LLC

(57) ABSTRACT

A device for damping torsion oscillations comprises support rotatably movable about an axis. A pendular body comprises first and second axially spaced pendular masses movable relative to the support. The first mass disposed axially on a first side of the support and the second mass disposed axially on a second side of the support. A member connects the first and second pendular masses. Each mass includes an opening in which the connecting member is force-fitted. The openings have radially exterior and interior edges. The connecting member has radially interior and exterior edges. The radially exterior edge extends between two angular ends of the connecting member, each defined by a lug. Each mass exerts a force on each lug, and via a one nose piece projecting radially and carried by the radially interior edge of the opening or the radially interior edge of the connecting member.

20 Claims, 4 Drawing Sheets

DEVICE FOR DAMPING TORSION OSCILLATIONS, NOTABLY FOR A MOTOR VEHICLE TRANSMISSION SYSTEM

CROSS-REFERENCE TO RELATED APPLICATIONS AND CLAIM TO PRIORITY

This application claims priority to Patent Application No. 1550079 filed Jan. 7, 2015 in France, the disclosure of which is incorporated herein by reference and to which priority is claimed.

FIELD OF THE INVENTION

The present invention concerns a device for damping torsion oscillations, notably for a motor vehicle transmission system.

BACKGROUND OF THE INVENTION

In such an application, the torsion oscillation damping device may be integrated into a torsion damping system of a clutch adapted selectively to connect the internal combustion engine to the gearbox in order to filter vibrations caused by the acyclic operation of the engine.

Alternatively, in such an application, the torsion oscillation damping device may be integrated into a friction disk of the clutch or a hydrodynamic torque converter.

Such a torsion oscillation damping device conventionally employs a support and one or more pendular bodies mobile relative to that support, the movement relative to the support of the pendular bodies being guided by rolling members cooperating on the one hand with rolling tracks secured to the support and on the other hand with rolling tracks secured to the pendular bodies. Each pendular body comprises two pendular masses riveted together, for example. The rivet thus forms a connecting member for the two pendular masses. This rivet has two heads projecting axially beyond each pendular mass in the direction away from the support, therefore generating a certain bulk.

There exists a requirement to be able to secure two pendular masses of a pendular body in a manner that alleviates the aforementioned disadvantage.

SUMMARY OF THE INVENTION

A first aspect of the invention aims to address this requirement and does so by means of a device for damping torsion oscillations, comprising:
 a support able to move in rotation about an axis,
 at least one pendular body comprising: first and second pendular masses spaced axially relative to each other and mobile relative to the support, the first pendular mass being disposed axially on a first side of the support and the second pendular mass being disposed axially on a second side of the support, and at least one member connecting the first and second pendular masses matching said masses and force-fitted thereto,
each pendular mass including an opening in which the connecting member is force-fitted, this opening having a radially exterior edge and a radially interior edge, and the connecting member having a radially interior edge and a radially exterior edge, said radially exterior edge extending between two angular ends each defined by a lug of the connecting member, each pendular mass exerting on the connecting member force-fitted in its opening:
 a force on each lug of the connecting member, and
 a force via at least one nose piece projecting into the opening and carried by either the radially interior edge of the opening or the radially interior edge of the connecting member.

In such a device, the forces exerted on the connecting member by each pendular mass make it possible to ensure that the connecting member is retained in this pendular body without the connecting member being subjected to stresses that risk affecting its integrity.

At least three contact areas may exist between a pendular mass and the connecting member.

The projecting nose piece may be carried by the radially interior edge of the opening. This nose piece then projects radially into the opening.

Alternatively, a nose piece may be carried by the radially interior edge of the connecting member.

In the context of the present application:
 "axially" means "parallel to the rotation axis of the support",
 "radially" means "along an axis lying in a plane orthogonal to the rotation axis of the support and intersecting that rotation axis of the support",
 "angularly" or "circumferentially" means "about the rotation axis of the support", and
 "secured" means "rigidly coupled".

The two pendular masses can be exactly the same shape, and from one pendular mass to the other of the same pendular body, the forces exerted by the same shape parts of the pendular masses on the connecting member can be in the same direction.

The connecting member may be secured to each pendular mass only by force-fitting, i.e. without any additional securing means such as a weld or a rivet. This therefore reduces the number of operations necessary to assemble the pendular body.

Alternatively, the connecting member is secured to each pendular mass by force-fitting and by another securing method, for example welding or riveting or screwing. One or more rivets pass through the connecting member, for example, each rivet extending from one pendular mass to the other.

Two nose pieces may be carried by the radially interior edge of the opening or by the radially interior edge of the connecting member, each nose piece then enabling the pendular mass to exert a force on the connecting member force-fitted in the opening.

Four contact areas then exist between a pendular mass and the connecting member. The forces exerted by a pendular mass on the connecting member can then be distributed in a satisfactory manner. The two nose pieces may be positioned relative to each other so that a bending force is exerted on the connecting member by the pendular mass via said nose pieces.

The radially interior edge of the connecting member, respectively of the opening, is substantially plane, for example, and in a plane orthogonal to the rotation axis of the support, the distance between the two nose pieces carried by the radially interior edge of the opening, respectively carried by the radially interior edge of the connecting member, may be between 30% and 100% inclusive, preferably between 50% and 90% inclusive, of the length of the radially interior edge of the connecting member, respectively of said radially interior edge of the opening.

Alternatively, the two nose pieces may be positioned relative to each other so that a compression force is exerted by the pendular mass on the connecting member via said nose pieces. The radially interior edge of each opening may have two nose pieces projecting radially into the opening, said nose pieces succeeding each other on moving along said radially interior edge of the opening, and each pendular mass exerts on the connecting member force-fitted in its opening:

a force on each lug of the connecting member, and a force via each nose piece of its radially interior edge on the radially interior edge of the connecting member.

Throughout the foregoing description, when two nose pieces are carried by the radially interior edge of the opening, each lug and the opening of each pendular mass may be configured so that, in a plane orthogonal to the rotation axis, the force exerted on each lug is in a direction intersecting the radially interior edge of the opening at a point situated between the two nose pieces thereof. Such a direction of the forces can make it possible for the latter to exert a controlled compression on the connecting member.

Alternatively, throughout the foregoing description, when two nose pieces are carried by the radially interior edge of the connecting member, each lug and the opening of each pendular mass may be configured so that, in a plane orthogonal to the rotation axis, the force exerted on each lug is in a direction intersecting the radially interior edge of the connecting member at a point situated between the two nose pieces thereof.

Each lug and the opening of each pendular mass are such that the direction of these forces produces an optimum result, for example.

In one particular case, each lug and the opening of each pendular mass are configured so that, in a plane orthogonal to the rotation axis, the force exerted on each lug is in a direction intersecting the radially interior edge of the opening, respectively the radially interior edge of the connecting member, at a point situated substantially equidistant from each nose piece.

In a variant, the pendular mass does not exert forces on the connecting member via its lugs, but the radially exterior edge of the opening projects toward the interior of the opening and this projection comes into contact with the radially exterior edge of the connecting member at a distance from each lug, this contact corresponding to the pendular mass exerting a force on the connecting member. In accordance with this variant, one or more radial nose pieces may be provided on the radially interior edge of the opening or on the radially interior edge of the connecting member so that there exists a plurality of areas of contact between the pendular mass and the connecting member: a contact area associated with the projection formed on the radial exterior edge of the opening and a contact area associated with each nose piece.

Throughout the foregoing description, each connecting member may be produced in one piece, for example by a percussion process. Alternatively, as already mentioned, each connecting member may be produced in a number of parts, one of the parts being formed by rivets participating in securing the connecting member to the pendular body, for example.

Each opening may extend along an axis and the connecting member may have, successively along that axis, in this opening:

an end portion forming a free space with the lateral wall of the opening facing this end portion of the connecting member, and another portion resting against the lateral wall of the opening facing this other portion of the connecting member, and the free space may have a size enabling it to receive some or all of the material of the pendular mass or of the other portion of the connecting member that is displaced when force-fitting the connecting member in this opening.

The displaced material may have been torn off the pendular mass or the other portion of the connecting member, then forming swarf. Alternatively, the displaced material may remain attached to the pendular mass or to the other portion of the connecting member, this displaced mass leading to deformation of the pendular mass or of the other portion of the connecting member relative to its shape before force-fitting. This deformation corresponds to the presence of a bead on the pendular mass or on the connecting member, for example.

The existence of the free space, sized to receive all or part of the material displaced in this way, reduces or evens eliminates the presence of burrs on the damping device resulting from force-fitting the connecting member. Such a damping member free of burrs is therefore better suited to the quality requirements of a client.

Before force-fitting the connecting member in the opening, the latter notably has a transverse dimension relative to the axis of the opening that is greater than the corresponding transverse dimension of the opening, with the result that there exists an area of theoretical encroachment of the connecting member on the lateral wall of the opening. Because of the existence of this theoretical encroachment area, the displacement of material referred to above occurs. The size of the free space may then be chosen as a function of the size of the theoretical encroachment area, so that the free space can receive some or all of the displaced material. The volume of the free space is proportional to the volume of the theoretical encroachment area, for example, and the coefficient of proportionality may be chosen to take account of the fact that not all of the material contained in the theoretical encroachment area is displaced. The coefficient of proportionality is between 0.05 and 0.2 inclusive, for example.

The free space may be produced by a chamfer on each edge of said end portion of the connecting member facing the lateral wall of the opening. Such a chamfer is simple to produce. Other shapes of the end portion of the connecting member enabling such a free space to be provided are nevertheless possible.

The connecting member force-fitting axis may coincide with the axis of the opening.

The connecting member extends between two axial ends, for example, each axial end being disposed in an opening of one of the pendular masses and each axial end comprising: the end portion forming with the lateral wall of the opening the free space and the other portion in contact with said lateral wall.

Throughout the foregoing description, the damping device may comprise at least one rolling member cooperating on the one hand with a rolling track secured to the support and on the other hand with a rolling track secured to the pendular body to guide the movement of the pendular body relative to the support.

The rolling track defined by the pendular body may then be defined by the radially exterior edge of the connecting member. A portion of the contour of this radially exterior edge of the connecting member defines the rolling track secured to the pendular body, for example. Alternatively, a coating may be deposited on this portion of the radially exterior edge of the connecting member to form this rolling track secured to the pendular body. In this case, the above first aspect of the invention can make it possible to subject the rolling track secured to the pendular body to controlled compression, notably when the two nose pieces mentioned above are positioned relative to each other so that a bending force is exerted on the connecting member by said nose pieces. The service life of the rolling track defined by the connecting member can be extended in this way. Such a bending force can for example make it possible to maintain a constant shape of this rolling track, independently of the stresses to which said track is subjected in use. The rolling track defined by the radial exterior edge of the connecting member may have a concave shape in a plane orthogonal to the rotation axis.

Alternatively, the rolling track defined by the radial exterior edge of the connecting member may have a plurality of distinct shapes (see below).

The pendular body may comprise two connecting members, each connecting member being force-fitted in the first and second pendular masses, each connecting member defining a rolling track for a rolling member specific to said connecting member, each connecting member further cooperating with a rolling track defined by the support to guide the movement of the pendular body relative to the support.

Throughout the foregoing description, each rolling member is for example a roller of circular section orthogonal to the rotation axis of the support. The axial ends of the roller may be free of any thin annular rim. The roller is made of steel, for example.

Throughout the foregoing description, the shape of the rolling tracks may be such that the pendular bodies are moved relative to the support only in translation with respect to an imaginary axis parallel to the rotation axis of the support.

Alternatively, the shape of the rolling tracks may be such that the pendular bodies are moved relative to the support both:
  in translation with respect to an imaginary axis parallel to the rotation axis of the support, and
  also in rotation about the centre of gravity of said pendular body, such movement being referred to as "combined movement" and described in application DE 10 2011 086 532, for example.

The rolling tracks secured to the support and the rolling tracks secured to the pendular body and cooperating with the same rolling member can be at least in part radially facing each other, i.e. there exist planes orthogonal to the rotation axis in which both these rolling tracks extend.

The device may comprise at least one intermediate part at least one portion of which is disposed axially between the support and a pendular mass of the pendular body. Such an intermediate part can therefore limit the axial movement of the pendular body relative to the support, thereby preventing axial impacts between said parts, and therefore wear and unwanted noise, notably when the support and/or the pendular mass are made of metal. A plurality of intermediate parts, for example in the form of shoes, may be provided. The intermediate parts are notably made from a damping material such as plastic or rubber.

The intermediate parts are carried by the pendular bodies, for example. The intermediate parts may be positioned on a pendular body so that there is always at least one intermediate part at least a portion of which is disposed axially between a pendular mass and the support, whatever the relative positions of the support and said mass on movement of the pendular body relative to the support.

Throughout the foregoing description, the support may be made in one piece or not.

Throughout the foregoing description, the device may comprise at least one abutment damping member coming simultaneously into contact with the support and the pendular body in relative positions of the support and the pendular body. Said relative positions may comprise at least one of the following: the rest position of the device, the position with the pendular body abutted against the support following a movement in the anticlockwise direction of this pendular body from the rest position, and the position with the pendular body abutted against the support following a movement in the clockwise direction of this pendular body from the rest position.

In the context of the present application, the torsion oscillation damping device is at rest when it is not filtering torsion oscillations.

The abutment damping member may have elastic properties enabling the damping of impacts linked to contact between the support and the pendular body. This damping is then made possible by compression of the abutment damping member. The abutment damping member is made of an elastomer or rubber, for example.

The abutment damping member is advantageously carried by the pendular body, for example being disposed radially internally relative to some or all of the radially interior edge of the connecting member.

The device comprises a plurality of pendular bodies, for example, between two and eight of them, for example, notably three or six pendular bodies. All these pendular bodies may succeed one another circumferentially. The device may therefore comprise a plurality of planes orthogonal to the rotation axis in each of which all the pendular bodies are disposed.

In accordance with a second aspect, the invention further consists in a device for damping torsion oscillations, comprising:
  a support able to move in rotation about an axis,
  at least one pendular body comprising: first and second pendular masses spaced axially relative to each other and mobile relative to the support, the first pendular mass being disposed axially on a first side of the support and the second pendular mass being disposed axially on a second side of the support, and at least one member connecting the first and second pendular masses matching said masses,
the connecting member being secured to each of the pendular masses only by force-fitting.

Some or all of the features mentioned above in relation to the first aspect of the invention apply to this second aspect of the invention.

The invention further consists in, in accordance with a third aspect, a torsion oscillation damping device comprising:
  a support able to move in rotation about an axis,
  at least one pendular body comprising: first and second pendular masses spaced axially relative to each other and mobile relative to the support, the first pendular mass being disposed axially on a first side of the support and the second pendular mass being disposed axially on a second side of the support, and at least one member connecting the first and second pendular masses matching said masses,
the connecting member being secured to each of the pendular masses by force-fitting, each pendular mass including an opening extending along an axis and the connecting member including, along that axis, successively in that opening:
  an end portion producing a free space with the lateral wall of the opening facing this end portion of the connecting member, and another portion resting against the lateral wall of the opening facing this other portion of the connecting member, the free space having a size enabling it to receive some or all of the material of the pendular mass or of the other portion of the connecting member displaced when force-fitting the connecting member in this opening.

Some or all of the features mentioned above in relation to the first aspect of the invention apply to this third aspect of the invention.

To be more specific, in accordance with this third aspect of the invention, before force-fitting the connecting member in the opening, the latter has a transverse dimension relative to the axis of the opening that is greater than the corresponding transverse dimension of the opening so that there exists an area of theoretical encroachment of the connecting member on the lateral wall of the opening. Because of the existence of this theoretical encroachment area, the displacement of material referred to above occurs. The size of the free space may then be chosen as a function of the size of the theoretical encroachment area so that the free space is able to receive some or all of the displaced material. The volume of the free space is proportional to the volume of the theoretical encroachment area for example and the coefficient of proportionality may be chosen to take account of the fact that the material contained in the theoretical encroachment area is not displaced. The coefficient of proportionality is between 0.05 and 0.2 inclusive, for example.

The free space may be produced by a chamfer on each edge of said end portion of the connecting member facing the lateral wall of the opening. Such a chamfer is simple to produce. Other shapes of the end portion of the connecting member making it possible to provide such a free space are nevertheless possible.

The connecting member force-fitting axis may coincide with the axis of the opening.

The connecting member extends between two axial ends, for example, each axial end being disposed in an opening of one of the pendular masses and each axial end comprising: the end portion forming with the lateral wall of the opening the free space and the other portion in contact with said lateral wall.

The invention further consists in, in accordance with a fourth aspect, a torsion oscillation damping device comprising:
- a support able to move in rotation about an axis,
- at least one pendular body comprising: first and second pendular masses spaced axially relative to each other and mobile relative to the support, the first pendular mass being disposed axially on a first side of the support and the second pendular mass being disposed axially on a second side of the support, and at least one member connecting the first and second pendular masses matching said masses and secured thereto,
- at least one rolling member interacting on the one hand with a rolling track secured to the support and on the other hand with a rolling track secured to the pendular body to guide the movement of the pendular body relative to the support, and
- at least one abutment damping member for the pendular body relative to the support, the rolling track secured to the pendular body including:
  - a first portion of first shape on which the rolling member rolls when it moves in a first range of movement from a rest position, and
  - a second portion of second shape different from the first shape on which the rolling member rolls when it moves beyond the first range of movement in a second range of movement in which the abutment damping member comes into contact both with the support and with the pendular body.

Some or all of the features mentioned above in relation to the first aspect of the invention apply to this fourth aspect of the invention.

The first shape may be chosen to enable filtering of torsion oscillations by the pendular body when the rolling member rolls along the first portion of the rolling track, which is not necessarily the case with the second shape.

The action of the abutment damping member to damp the contact between the support and the pendular body therefore does not affect the filtering of torsion oscillations by the pendular body since it occurs when the rolling member rolls along the second portion of the rolling track. This fourth aspect of the invention therefore makes it possible for the abutment damping function not to be obtained to the detriment of the filtering function.

The rolling track secured to the pendular body is advantageously defined by an edge, notably the radially exterior edge, of the connecting member. In this case, the second portion of this rolling track encompasses each circumferential end of the rolling track.

The first portion of the rolling track defined by the edge of the connecting member extends on either side of the position occupied by the rolling member in the rest position of the device, and this first portion may have a length measured along said first portion of the track between 70% and 90% inclusive of the total length of this rolling track, this total length being measured between the two circumferential ends of this track.

In a plane orthogonal to the rotation axis of the support, the first portion of the rolling track may have a concave shape and the second portion of the rolling track may have a convex shape, such shapes being particularly suited to the filtering function for the first portion of the rolling track and to the function of damping by the abutment damping member for the second portion of the rolling track.

The invention further consists in, in accordance with a fifth aspect, a component for a motor vehicle transmission system, the component notably being a damping double flywheel, a hydrodynamic torque converter or a friction disk, comprising a torsion oscillation damping device in accordance with any one of the first to fourth aspects of the invention.

The support of the torsion oscillation damping device may then be one of the following:
- a web of the component,
- a guide washer of the component,
- a phase washer of the component, or
- a support distinct from said web, said guide washer and said phase washer.

BRIEF DESCRIPTION OF THE DRAWINGS

The invention will be better understood on reading the following description of embodiments thereof and examining the appended drawings, in which.

DETAILED DESCRIPTION OF THE PREFERRED EMBODIMENT(S)

Figure 1:
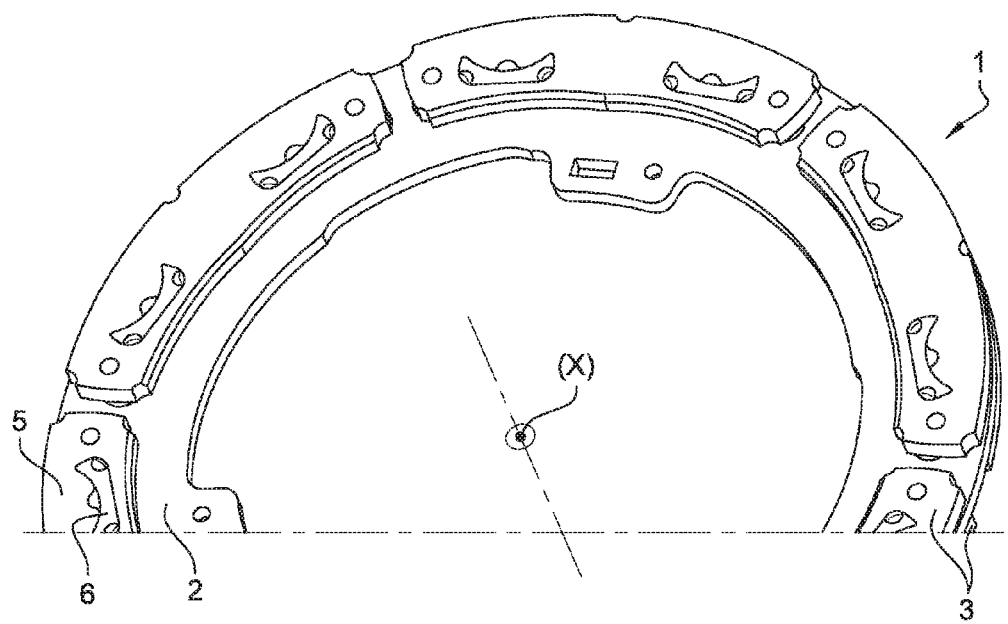
FIG. 1 shows diagrammatically part of a torsion oscillation damping device.

There is shown in FIG. 1 a torsion oscillation damping device 1. The damping device 1 is of the pendular oscillatory type. The device 1 is notably adapted to equip a motor vehicle transmission system, being integrated into a component that is not shown of such a transmission system, for example, this component being a damping double flywheel, a hydrodynamic torque converter or a friction disk, for example.

This component may form part of a power train of a motor vehicle, including an internal combustion engine, notably with three or four cylinders.

In FIG. 1, the device 1 is at rest, i.e. it is not filtering torsion oscillations transmitted by the power train because of the acyclic operation of the internal combustion engine.

In known manner, such a component may comprise a torsion damper including at least one input element, at least one output element, and circumferentially acting elastic return means that are disposed between said input and output elements. In the context of the present application, the terms "input" and "output" are defined relative to the direction of transmission of torque from the internal combustion engine to the wheels of the vehicle.

In the embodiment considered here, the device 1 comprises:
  a support 2 able to rotate about an axis X, and
  a plurality of pendular bodies 3 mobile relative to the support 2.

In the example considered here, there are six pendular bodies 3 uniformly distributed around the perimeter of the axis X.

The support 2 of the damper device 1 may consist of:
  an input element of the torsion damper,
  an output element or an intermediate phasing element disposed between two series of springs of the damper, or
  an element coupled in rotation to one of the aforementioned elements and separate therefrom, then being a support specific to the device 1, for example.

The support 2 is notably a guide washer or a phase washer.

In the example considered here, the support 2 has the overall shape of a ring having two opposite sides 4 which here are plane faces.

As seen in FIG. 1, each pendular body 3 comprises in the example considered here:
  two pendular masses 5, each pendular mass 5 extending axially facing one side 4 of the support 2, and
  two connecting members 6 securing the two pendular masses 5.

The connecting members 6, also referred to as "spacers", are offset angularly in the example considered here.

Each connecting member 6 lies partly in a window 9 in the support 2. In the example considered here, the window 9 defines a free space inside the support, this window being delimited by a closed contour 10. As emerges hereinafter, the connecting member 6 is secured to each pendular mass 5 by being force-fitted in an opening 7 in said pendular mass 5.

Figure 2:
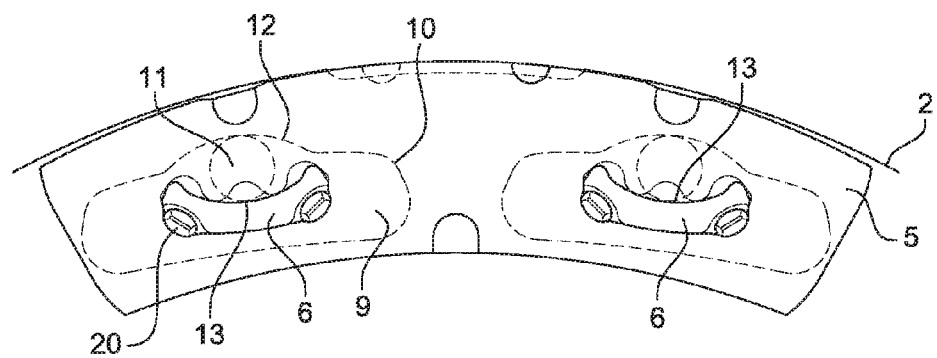
FIG. 2 shows a detail of FIG. 1.

In the example considered here the device 1 further comprises rolling members 11, seen in FIG. 2, for example, guiding the movement of the pendular bodies 3 relative to the support 2. Here the rolling members 11 are rollers having a circular cross section.

In the example described here, the movement relative to the support 2 of each pendular body 3 is guided by two rolling members 11, each of these cooperating with one of the connecting members 6 of the pendular body 3.

Each rolling member 11 cooperates on the one hand with a rolling track 12 defined by the support 2 that is formed here by a portion of the contour 10 of the window 9 in the support and on the other hand with a rolling track 13 defined by the pendular body 3 that is formed here by a portion of the exterior contour of the connecting member 6. Here the rolling track 13 is of concave shape.

To be more precise, each rolling member 11 interacts at the radially interior level with the rolling track 13 and at the radially exterior level with the rolling track 12 when it moves relative to the support 2 and the pendular body 3, being loaded only in compression between the rolling tracks 12 and 13 previously mentioned.

As can be seen in FIG. 2, the device 1 may equally comprise abutment damping members 20 adapted to come simultaneously into contact with a connecting member 6 and with the support 2 in certain relative positions of the support 2 and the pendular bodies 3, such as the positions of coming into abutment following movement from the rest position. Here each abutment damping member 20 is secured to a pendular body 3, being mounted on each pendular body and disposed radially between the connecting member 6 and the contour 10 of the opening 9.

Although this is not shown, the device 1 may further comprise intermediate parts disposed axially between each pendular mass 5 and the support 2, each intermediate part being mounted on the pendular mass 5, for example.

As already mentioned, in the examples described with reference to FIGS. 3 to 9, each connecting member 6 is force-fitted in an opening 7 of a pendular mass 5. Each axial end of a connecting member 6 is therefore retained in an opening 7 of a pendular mass 5.

Each connecting member may have a section orthogonal to the rotation axis X of the support that is substantially constant along that axis X.

Figure 3:
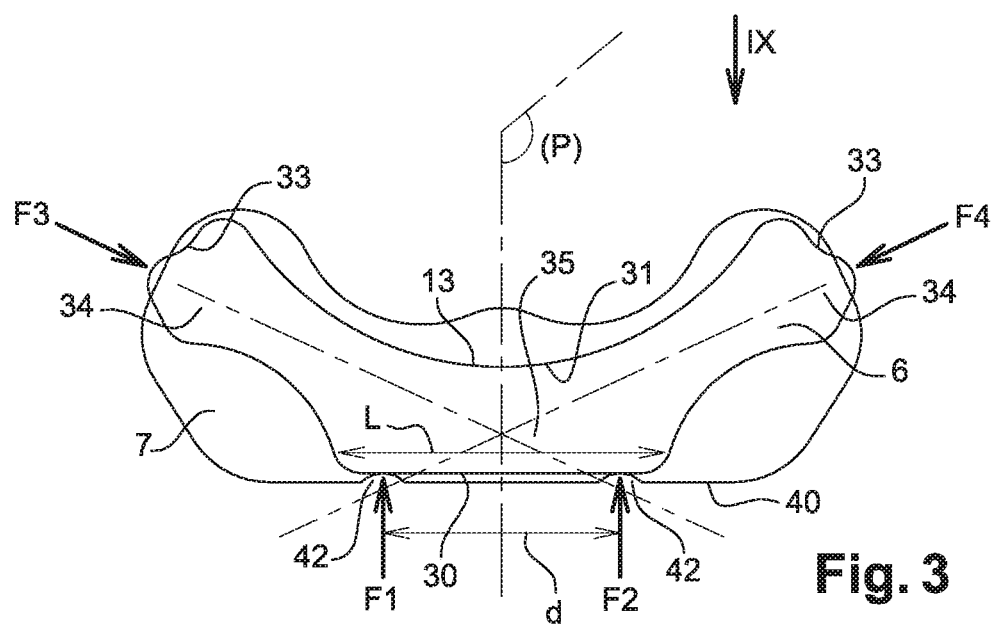
FIG. 3 shows a connecting member force-fitted in the opening of a pendular mass in accordance with a first variant of a first aspect of the invention.
Figure 7:
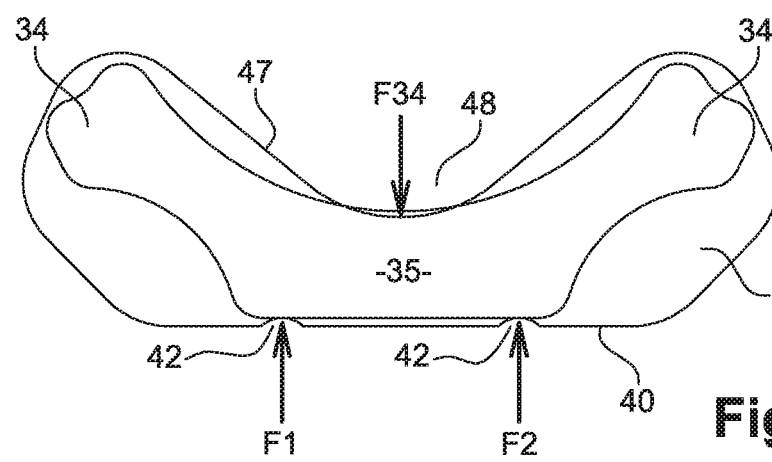
FIG. 7 is a view similar to FIG. 3 in accordance with another aspect of the invention.
Figure 4:
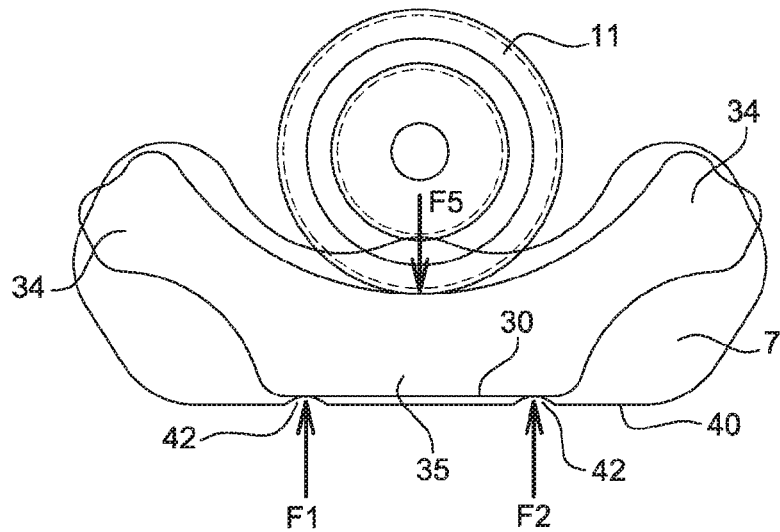
FIG. 4 shows the connecting member from FIG. 3 when it is cooperating with a rolling member.

In the example considered here, the connecting member 6 comprises a plane radially interior edge 30 and a radially exterior edge 31 a portion of which defines the rolling track 13 already mentioned. The radially exterior edge 31 is concave in the plane of FIG. 3. This radially exterior edge 31 extends, in planes orthogonal to the rotation axis X, between two angular ends 33 each of which is defined by a lug 34 of the connecting member 6. The two lugs 34 diverge from each other from a core 35 of the connecting member 6 in the direction radially away from the rotation axis X of the support 2. As can be seen in FIGS. 3 and 4, the core 35 of the connecting member corresponds to the portion of the connecting member 6 the radially exterior edge of which defines the hollow of the concavity formed by the radially exterior edge 31.

The lugs 34 of the connecting member 6 may be images of each other with respect to a plane P containing an axis parallel to the rotation axis X of the support 2.

The connecting members 6 from FIGS. 3 to 7 are secured only to each pendular mass 5 by force-fitting.

The connecting members 6 from FIGS. 3 to 6 cooperate with each pendular mass 5 so as to compress the rolling track 13 defined by this connecting member 6 in a controlled fashion.

As can be seen in FIG. 3, the radially interior edge 40 of the opening 7 may include radial nose pieces 42 projecting into the opening 7. In FIG. 3 there are two radial nose pieces 42 and these radial nose pieces 42 are separated from each other by a distance d between 50% and 90% inclusive of the length L of the radially interior edge 30 of the connecting member 6, this length L of the edge 30 being measured in a plane orthogonal to the rotation axis X of the support 2. Such a distance between the two nose pieces enables them to exert in combination a bending force on the connecting member 6. This bending force can make it possible to close up the rolling track 13, to open it out, or to be such that the shape of the rolling track 13 remains constant regardless of the stresses applied to it.

The pendular mass 5 therefore exerts two forces F1 and F2 oriented substantially radially outward on the connecting member 6 when the latter is force-fitted in the opening 7.

As shown in FIG. 3, the pendular mass 5 can exert two other forces F3 and F4 on the connecting member 6 so that there then exist four areas of contact between the pendular mass 5 and the connecting member 6.

Here each lug 34 is subjected to a force F3 or F4 by the pendular mass 5. A portion of the contour of the lug 34 therefore comes into contact with a portion of the contour of the opening 7 and this contact corresponds to the pendular mass 5 exerting the force F3 or F4.

As shown in FIG. 3, these forces exerted on the lugs 34 may have a direction intersecting the radially interior edge 30 of the connecting member 6 between the two radial nose pieces 42.

As can be seen in FIG. 4, when the support is driven in rotation at high speeds, the rolling member 11 also exerts a compression force F5 on the rolling track 13, this force F5 being added to the forces F1 to F4 exerted on the connecting member 6 by the pendular mass 5.

Figure 5:
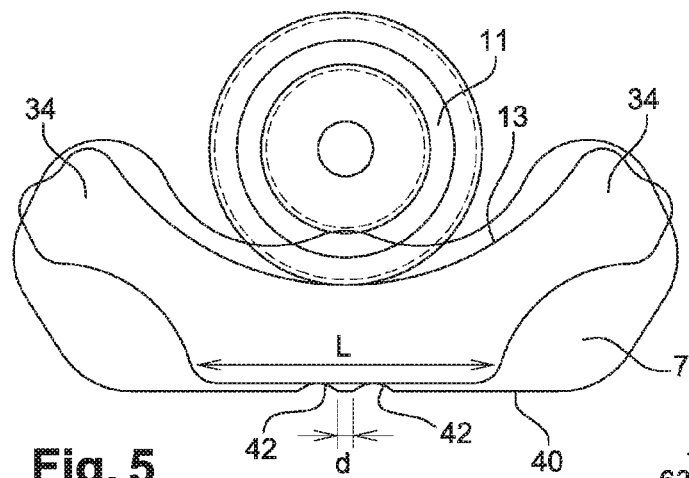
FIG. 5 is a view similar to FIG. 4 in accordance with a second variant of the first aspect of the invention.

In FIG. 5 the connecting member 6 and the pendular mass 5 differ from those that have just been described with reference to FIGS. 3 and 4 in the disposition of the radial nose pieces 42. Here the radial nose pieces 42 are still offset along the radially interior edge 40 but this time by a distance d that is between 10% and 40% inclusive of the length L of the radially interior edge 30 of the connecting member 6. Here the radial nose pieces 42 can in combination exert a compression force on the connecting member 6.

Figure 6:
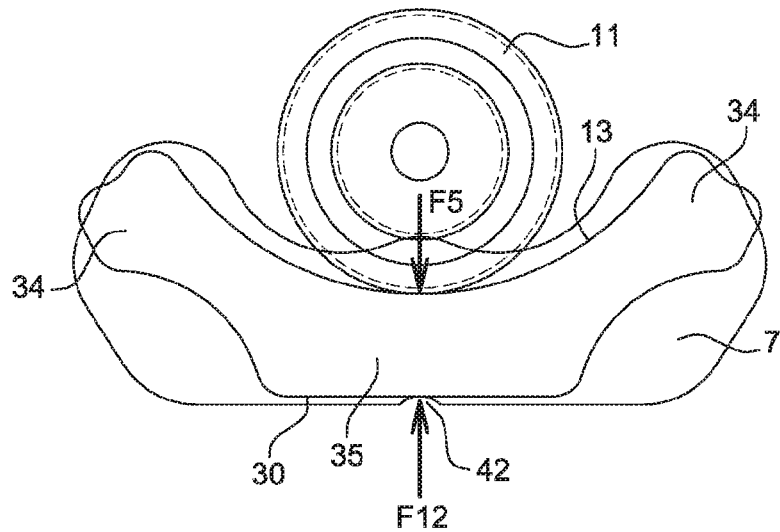
FIG. 6 is a view similar to FIG. 4 in accordance with a third variant of the first aspect of the invention.

The connecting member 6 and the pendular mass 5 from FIG. 6 differ from those that have just been described with reference to FIGS. 3 to 5 in the number of radial nose pieces on the radially interior edge 40 of the opening 7. In this example there is only one radial nose piece 42 and it exerts a force F12 on a substantially median area of the radially interior edge 30 of the connecting member 6. In a similar fashion to what has already been described with reference to FIG. 3, forces F3 and F4 are exerted on each lug 34 of the connecting member 6 by the pendular mass 5. The connecting member 6 and the pendular mass 5 from FIG. 7 differ from those that have just been described with reference to FIGS. 3 to 6. Indeed, the shape of the opening 7 is different. The radially exterior edge 47 of this opening 7 defines a radial projection 48 in the opening 7 and this radial projection 48 comes into contact with the connecting member 6 when the latter is force-fitted in the opening 7 of the pendular mass 5. By virtue of this contact, a force F12 directed substantially radially inward is exerted on the connecting member 6 by the radially exterior edge 47 of the opening 7. This force replaces the forces F3 and F4 exerted on each lug 34 of the connecting member from FIGS. 3 to 6. The connecting member 6 is then subjected to a bending force by the combined effect of the forces F1, F2 and F34.

Figure 8:
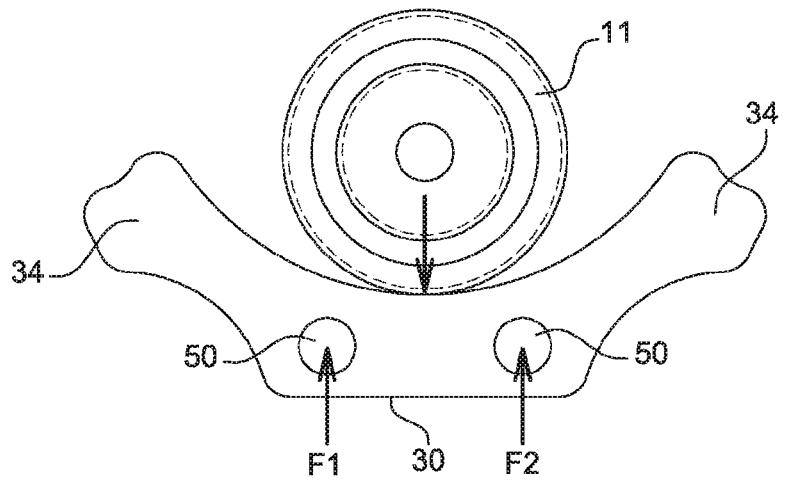
FIG. 8 is a view similar to FIG. 4 in accordance with a further aspect of the invention.

The connecting member and the pendular mass 5 from FIG. 8 differ from those that have just been described in that the connecting member 6 is no longer secured to each pendular mass 5 only by force-fitting. A plurality of rivets 50 may therefore be used. In the example described here, there are two rivets 50. The radially interior edge 40 of the opening 7 may then be free of radial nose pieces and the distance between the rivets 50 may be substantially equal to the distance d from FIG. 3. The forces F1 and F2 previously mentioned are then exerted at the level of each rivet 50. The loading of the connecting member 6 then occurs when the rolling member 11 applies a force against the rolling track 13.

Another aspect of the invention will now be described with reference to FIG. 9, being combinable or not with the device described with reference to FIGS. 3 to 8.

Figure 9:
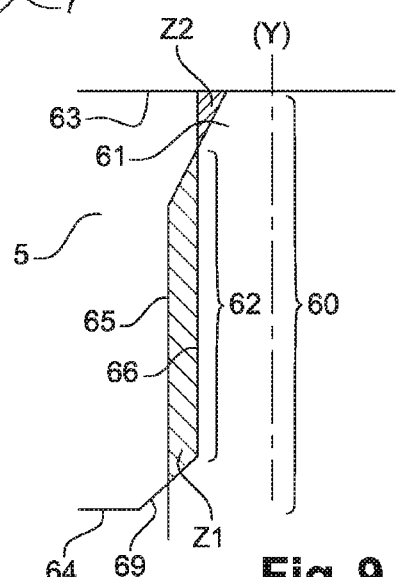
FIG. 9 shows diagrammatically part of a yet further aspect of the invention.

Here FIG. 9 is a view of the device from FIG. 3 in the direction of the arrow IX. As can be seen, the opening 7 extends along an axis Y that is parallel to the rotation axis X of the support 2. The connecting member 6 has an axial end 60 received in the opening 7, this end 60 having previously been force-fitted in the opening 7 along a force-fitting axis parallel to the axis Y of the opening 7. As can be seen in FIG. 9, the axial end 60 of the connecting member 6 comprises an end portion 61 that is the first to be introduced into the opening 7 when force-fitting it and another portion 62 introduced into the opening 7 after the end portion 61.

As can be seen in FIG. 9, following this force-fitting, the end portion 61 may come to the same level as the exterior wall 63 of the pendular mass 5 opposite the wall 64 of the pendular mass 5 that axially faces the support 2.

As shown in FIG. 9, before force-fitting, the connecting member 6 has, at the level of the lugs 34, lateral edges 65 that extend beyond the lateral wall 66 of the opening 7. An area Z1 of theoretical encroachment of the connecting member 6 on the lateral wall 66 of the opening 7 therefore exists. This area Z1 is cross-hatched in FIG. 9. A free space Z2, also cross-hatched in FIG. 9, moreover exists between the end portion 61 of the connecting member and the wall 66 of the opening 7. Here this free space is produced by chamfering at least one of the lateral edges 65 at the level of the end portion 61 of the connecting member. Because of this chamfer, a reserve of space is provided locally between the connecting member 6 and the lateral wall 66 of the opening, and this reserve can receive some or all of the material of the pendular mass 5 that is displaced by virtue of friction with the portion 62 on force-fitting that portion 62 in the opening 7.

In the example described here the volume of the free space Z2 is proportional to the volume of the encroachment area Z1 with a coefficient of proportionality between 0.05 and 0.2 inclusive.

As shown in FIG. 9, following the force-fitting, the lateral edges 65 of the end portion 61 are at a distance from the lateral wall 66 of the opening 7 whereas the lateral edges 65 of the other portion 62 come into contact with the lateral wall 66 of the opening 7.

The free space Z2 is for its part completely or only partially occupied by the material of the pendular mass 5 displaced when force-fitting the connecting member 6, this material comprising swarf or not.

As shown in FIG. 9, another chamfer 69 may be produced in the wall 64 of the pendular mass 5. This other chamfer 69 can favour the introduction of the axial end 60 of the connecting member 6 in the opening 7.

Another aspect of the invention combinable or not with the one that has been described with reference to FIGS. 3 to 9 will now be described with reference to FIGS. 10 and 11. As can be seen, the rolling track 13 is still defined by the radial exterior edge of the connecting member 6 but this rolling track 13 has, starting from the rest position P0 that the rolling member 11 occupies when the device 1 is at rest, successive different shapes.

The rolling track 13 therefore includes:
 a first portion 70 of first shape on which the rolling member 11 rolls when it moves from the rest position P0 in a first range of movement, and
 a second portion 71 of second shape different from the first shape on which the rolling member 11 rolls when it moves beyond the first range of movement in a second range of movement.

In this example, each abutment damping member 20 that is secured to the connecting member 6 is made of an elastomer or rubber and provides damping where the connecting member 6 comes into abutment against the support 2 by being compressed. The compression of the abutment damping member 20 occurs when the rolling member 11 rolls along the second portion 71 of the rolling track 13.

In this example, in a plane orthogonal to the axis X, the first portion 70 is concave and the second portion 71 is convex, such shapes favouring the filtering of torsion oscillations when the rolling member 11 rolls along the first portion 70.

Figure 10:
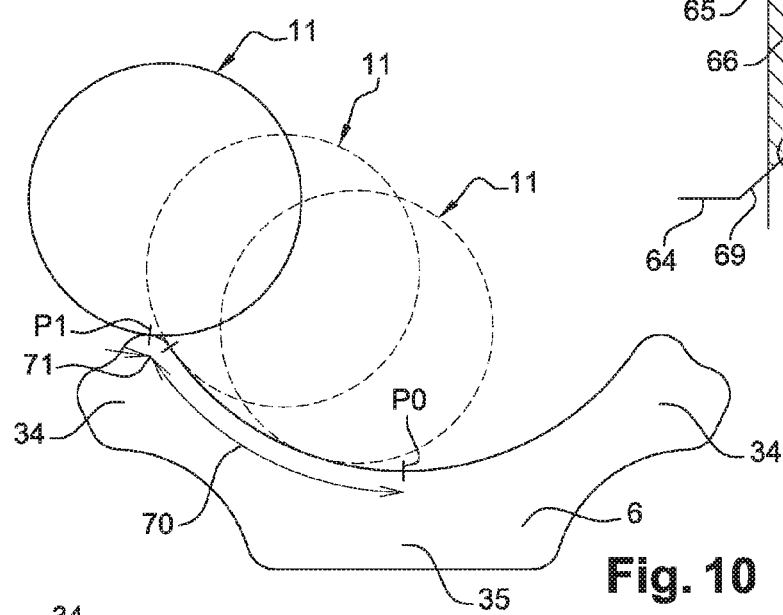
FIGS. 10 and 11 show diagrammatically part of a still further aspect of the invention.

As can be seen in FIG. 10, the length of the first portion 70, measured from the rest position P0 to the start of the second portion 71, is for example greater than 80% of the length of the rolling track measured between the position P0 and the position P1 at the end of travel reached by the rolling member 11 when the connecting member 6 is abutted against the support 2, the abutment damping member 20 then being compressed.

Figure 11:
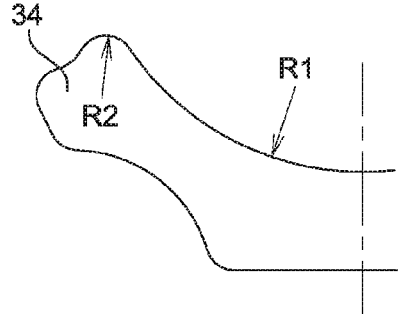

As shown in FIG. 11, the first portion 70 is for example defined by a constant radius R1 and the second portion 71 is defined by another constant radius R2.

The invention is not limited to the examples that have just been described.

The invention claimed is:

1. Device (1) for damping torsion oscillations, comprising:
 a support (2) able to move in rotation about an axis (X),
 at least one pendular body (3) comprising: first and second pendular masses (5) spaced axially relative to each other and mobile relative to the support (2), the first pendular mass (5) being disposed axially on a first side (4) of the support (2) and the second pendular mass (5) being disposed axially on a second side (4) of the support (2), and at least one member (6) connecting the first and second pendular masses (5) matching said masses and force-fitted thereto,
 each pendular mass (5) including an opening (7) in which the connecting member (6) is force-fitted, this opening having a radially exterior edge (47) and a radially interior edge (40), and the connecting member (6) having a radially interior edge (30) and a radially exterior edge (31), said radially exterior edge (31) extending between two angular ends (33) each defined by a lug (34) of the connecting member (6),
 each pendular mass (5) exerting on the connecting member (6) force-fitted in its opening (7):
  a force (F3, F4) on each lug (34) of the connecting member (6), and
  a force (F1, F2) via at least one nose piece (42) projecting into the opening (7) and carried by either the radially interior edge (40) of the opening (7) or the radially interior edge (30) of the connecting member (6).

2. Device according to claim 1, wherein the connecting member (6) being secured to each pendular mass (5) only by force-fitting.

3. Device according to claim 2, wherein two nose pieces (42) being carried by the radially interior edge (40) of the opening (7) or by the radially interior edge (30) of the connecting member (6), each nose piece (42) enabling the pendular mass (5) to exert a force on the connecting member (6) force-fitted in the opening (7).

4. Device according to claim 1, wherein two nose pieces (42) being carried by the radially interior edge (40) of the opening (7) or by the radially interior edge (30) of the connecting member (6), each nose piece (42) enabling the pendular mass (5) to exert a force on the connecting member (6) force-fitted in the opening (7).

5. Device according to claim 4, wherein the two nose pieces (42) being positioned relative to each other so that a bending force is exerted by the pendular mass (5) on the connecting member (6) via said nose pieces (42).

6. Device according to claim 5, wherein each lug (34) and the opening (7) of each pendular mass (5) being configured so that, in a plane orthogonal to the rotation axis (X), the force (F3, F4) exerted on each lug (34) has a direction intersecting the radially interior edge (40) of the opening (7) or the radially interior edge (30) of the connecting member (6) at a point situated between the two nose pieces (42) thereof.

7. Device according to claim 5, wherein the radially interior edge (40) of each opening (7) having said two nose pieces (42) projecting radially into the opening (7), said nose pieces (42) succeeding each other along said radially interior edge (40) of the opening and each pendular mass (5) exerting on the connecting member (6) force-fitted in its opening (7):
 a force (F3, F4) on each lug (34) of the connecting member (6), and
 a force (F1, F2) via each nose piece (42) of its radially interior edge (40) on the radially interior edge (42) of the connecting member (6).

8. Device according to claim 4, wherein the two nose pieces (42) being positioned relative to each other so that a compression force is exerted by the pendular mass (5) on the connecting member (6) via said nose pieces (42).

9. Device according to claim 8, wherein each lug (34) and the opening (7) of each pendular mass (5) being configured so that, in a plane orthogonal to the rotation axis (X), the force (F3, F4) exerted on each lug (34) has a direction intersecting the radially interior edge (40) of the opening (7) or the radially interior edge (30) of the connecting member (6) at a point situated between the two nose pieces (42) thereof.

10. Device according to claim 8, wherein the radially interior edge (40) of each opening (7) having said two nose pieces (42) projecting radially into the opening (7), said nose pieces (42) succeeding each other along said radially interior edge (40) of the opening and each pendular mass (5) exerting on the connecting member (6) force-fitted in its opening (7):
- a force (F3, F4) on each lug (34) of the connecting member (6), and
- a force (F1, F2) via each nose piece (42) of its radially interior edge (40) on the radially interior edge (42) of the connecting member (6).

11. Device according to claim 4, wherein each lug (34) and the opening (7) of each pendular mass (5) being configured so that, in a plane orthogonal to the rotation axis (X), the force (F3, F4) exerted on each lug (34) has a direction intersecting the radially interior edge (40) of the opening (7) or the radially interior edge (30) of the connecting member (6) at a point situated between the two nose pieces (42) thereof.

12. Device according to claim 11, wherein the radially interior edge (40) of each opening (7) having said two nose pieces (42) projecting radially into the opening (7), said nose pieces (42) succeeding each other along said radially interior edge (40) of the opening and each pendular mass (5) exerting on the connecting member (6) force-fitted in its opening (7):
- a force (F3, F4) on each lug (34) of the connecting member (6), and
- a force (F1, F2) via each nose piece (42) of its radially interior edge (40) on the radially interior edge (42) of the connecting member (6).

13. Device according claim 11, wherein each lug (34) and the opening (7) of each pendular mass (5) being configured so that, in a plane orthogonal to the rotation axis (X), the force (F3, F4) exerted on each lug (34) has a direction intersecting the radially interior edge (40) of the opening (7) or the radially interior edge (30) of the connecting member (6) at a point situated substantially equidistant from each nose piece (42).

14. Device according to claim 13, wherein the radially interior edge (40) of each opening (7) having said two nose pieces (42) projecting radially into the opening (7), said nose pieces (42) succeeding each other along said radially interior edge (40) of the opening and each pendular mass (5) exerting on the connecting member (6) force-fitted in its opening (7):
- a force (F3, F4) on each lug (34) of the connecting member (6), and
- a force (F1, F2) via each nose piece (42) of its radially interior edge (40) on the radially interior edge (42) of the connecting member (6).

15. Device according to claim 4, wherein the radially interior edge (40) of each opening (7) having two nose pieces (42) projecting radially into the opening (7), said nose pieces (42) succeeding each other along said radially interior edge (40) of the opening and each pendular mass (5) exerting on the connecting member (6) force-fitted in its opening (7):
- a force (F3, F4) on each lug (34) of the connecting member (6), and
- a force (F1, F2) via each nose piece (42) of its radially interior edge (40) on the radially interior edge (42) of the connecting member (6).

16. Device according to claim 1, comprising at least one rolling member (11) cooperating on the one hand with a rolling track (12) secured to the support and on the other hand with a rolling track (13) secured to the pendular body.

17. Device according to claim 16, wherein the rolling track (13) defined by the pendular body being defined by the radially exterior edge (31) of the connecting member (6).

18. Device according to claim 1, wherein the pendular body (3) comprising two connecting members (6), each connecting member (6) being force-fitted in the first (5) and second (5) pendular masses, each connecting member defining a rolling track (13) for a rolling member (11) specific to said connecting member (6), each connecting member further cooperating with a rolling track (12) defined by the support to guide the movement of the pendular body (3) relative to the support (2).

19. Torsion oscillation damping device (1), comprising:
- a support (2) able to move in rotation about an axis (X),
- at least one pendular body (3) comprising: first and second pendular masses (5) spaced axially relative to each other and mobile relative to the support (2), the first pendular mass (5) being disposed axially on a first side of the support (2) and the second pendular mass (5) being disposed axially on a second side of the support (2), and at least one member (6) connecting the first and second pendular masses (5), matching said masses,
- the connecting member (6) being secured to each of the pendular masses by force-fitting, each pendular mass including an opening (7) extending along an axis (Y) and the connecting member (6) including, along that axis (Y), successively in that opening:
- an end portion (61) producing a free space (Z2) with the lateral wall (66) of the opening (7) facing this end portion (61) of the connecting member, and
- another portion (62) resting against the lateral wall (66) of the opening (7) facing this other portion (62) of the connecting member,
- the free space (Z2) having a size enabling it to receive some or all of the material of the pendular mass (5) or of the other portion (62) of the connecting member (6) displaced when force-fitting the connecting member (6) in this opening (7).

20. A torsion oscillation damping device (1), comprising:
- a support (2) able to move in rotation about an axis,
- at least one pendular body (3) comprising: first and second pendular masses (5) spaced axially relative to each other and mobile relative to the support (2), the first pendular mass (5) being disposed axially on a first side of the support (2) and the second pendular mass (5) being disposed axially on a second side of the support (2), and at least one member (6) connecting the first and second pendular masses (5), matching said masses (5) and secured thereto,
- at least one rolling member (11) interacting on the one hand with a rolling track (12) secured to the support (2) and on the other hand with a rolling track (13) secured to the pendular body (3) to guide the movement of the pendular body (3) relative to the support (2), and
- at least one abutment damping member (20) for the pendular body (3) relative to the support (2),
- the rolling track (13) secured to the pendular body (3) including:
- a first portion (70) of first shape on which the rolling member (11) rolls when it moves in a first range of movement from a rest position (P0), and
- a second portion (71) of second shape different from the first shape on which the rolling member (11) rolls when it moves beyond the first range of movement in a second range of movement in which the abutment damping member (20) comes into contact both with the support (2) and with the pendular body (3).

* * * * *